United States Patent Office 3,158,621
Patented Nov. 24, 1964

3,158,621
DITHIOLIUM COMPOUNDS AND THEIR
PREPARATION
Erwin Klingsberg, Mountainside, N.J., assignor to American Cyanamid Company, Stamford, Conn., a corporation of Maine
No Drawing. Filed June 20, 1962, Ser. No. 203,723
6 Claims. (Cl. 260—327)

This application is a continuation-in-part of applications Serial No. 27,254, filed May 6, 1960, now abandoned, and Serial No. 70,146, filed November 18, 1960, now matured to U.S. 3,120,543.

This invention relates to new aromatic 1,2-dithiolium salts; new dyestuffs derived therefrom; and a process for making the latter.

More specifically, it relates to new compounds of the formula:

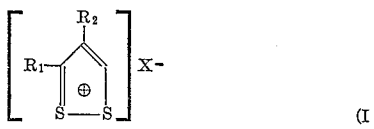

(I)

wherein each of the $R_1$ and $R_2$ groups is hydrogen, halogen, mono- or bicyclic aryl (e.g., phenyl, naphthyl and biphenyl), heteroaryl (e.g., pyridyl, furyl, thienyl), monocyclic lower aralkyl or lower alkyl (e.g., methyl, ethyl and propyl). Aryl groups in $R_1$ or $R_2$ may contain up to three halo (e.g., chloro and bromo), nitro, lower alkyl or lower alkoxy substituents. The anion $X^-$ may be derived from any acid, but acids that are not too weak (pKa not above 4) are preferable since they give stable salts.

This invention also includes the condensation reaction of a compound of Formula I with one or two moles of an N,N-disubstituted aniline having a free para position to yield basic or cationic dyestuffs of the formula:

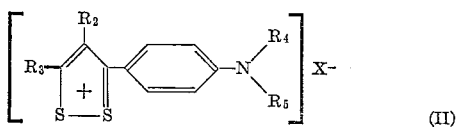

(II)

wherein $R_2$ and $X^-$ are as above defined, $R_3$ is either $R_1$ above or the radical:

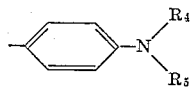

and $R_4$ and $R_5$ are individually either lower alkyl, lower hydroxyalkyl, phenyl, monocyclic lower aralkyl, substituted phenyl or monocyclic lower aralkyl (wherein the substituents are as defined above), or lower cyanoalkyl.

The dithiolium salts of Formula I are prepared by treating a trithione (i.e., a 1,2-dithiole-3-thione) with an organic peracid to effect oxidation of the nucleus, thereby forming a dithiolium cation according to the following equation:

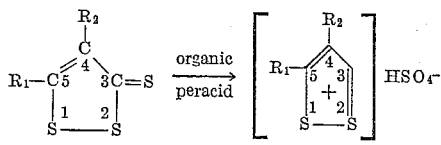

wherein $R_1$ and $R_2$ are defined as above. This reaction is more fully described, and also claimed, in Serial No. 27,254, cited above. In general, it involves treating the trithione with the peracid at, or below, room temperature, in an inert solvent such as acetone, and separating the resulting bisulfate salt. This water-soluble salt may be converted to other salts by addition of bromide, iodide, thiocyanate, fluoborate, picrate or perchlorate anions, or the like.

Trithiones which may be used in the preparation of the corresponding dithiolium compounds of this invention include such trithiones as 5-ethyl- or
5-methyl-1,2-dithiole-3-thione,
4,5-dimethyl-1,2-dithiole-3-thione,
4-butyl-5-methyl-1,2-dithiole-3-thione,
4-phenyl-5-methyl-1,2-dithiole-3-thione,
4-(p-nitrophenyl)-1,2-dithiole-3-thione,
4-methyl-1,2-dithiole-3-thione,
4-ethyl-1,2-dithiole-3-thione,
5-(2-furyl)-1,2-dithiole-3-thione,
4-phenyl-1,2-dithiole-3-thione,
4-p-tolyl-1,2-dithiole-3-thione,
4-p-t-butylphenyl-1,2-dithiole-3-thione,
5-phenyl-1,2-dithiole-3-thione,
5-α-naphthyl-1,2-dithiole-3-thione,
5-(p-dimethylaminophenyl)-1,2-dithione-3-thione,
5(p-chlorophenyl)-1,2-dithiole-3-thione,
5(p-anisyl)-1,2-dithiole-3-thione,
5-p-tolyl-1,2-dithiole-3-thione,
5-(o-anisyl)-1,2-dithiole-3-thione,
5-(2-thienyl)-1,2-dithiole-3-thione,
5-(3,4-dimethoxyphenyl)-1,2-dithiole-3-thione,
5-(5-methyl-2-methoxyphenyl)-1,2-dithiole-3-thione,
4-methyl-5-phenyl-1,2-dithiole-3-thione,
4-carbethoxy-5-phenyl-1,2-dithiole-3-thione,
4-methyl-5-(p-anisyl)-1,2-dithiole-3-thione,
4-methyl-5-(2,4-xylyl)-1,2-dithiole-3-thione,
4-methyl-5-(3,4-dimethoxyphenol)-1,2-dithiole-3-thione,
and 4,5-diphenyl-1,2-dithiole-3-thione.

The compound of Formula I wherein $R_1$ and $R_2$ are both hydrogens, can be prepared by the process described in application Serial No. 70,146, referred to above, which involves treating a dialkyl fumarate with sulfur to form a 5-carbalkoxy-1,2-dithiole-3-one; converting the 3-carbonyl group thereof to a 3-thiocarbonyl group with phosphorus pentasulfide; saponifying the resulting 3-carbalkoxy-1,2-dithiole-3-thione to yield the corresponding free acid; and treating this acid with a peracid to oxidize and decarboxylate simultaneously, thereby yielding the desired dithiolium compound.

Compounds of Formula I are readily converted to new cationic dystuffs of Formula II by a novel condensation reaction with a tertiary aromatic amine having a free para position: The dithiolium salts react at the 3 (or 5)-position when this position is free. These dyestuffs color acrylic fibers intense shades when applied by customary methods.

The condensation reaction proceeds readily in an inert solvent such as an alcohol (e.g., ethanol) at temperatures above 60° C. up to reflux. Yields are often improved by the use of a mild oxidizing agent such as potassium persulfate. The product may be isolated by conventional methods and purified by recrystalliaztion. If the dye still contains a free 5-position, repetition of the condensation reaction with a second molecule of tertiary amine gives new dyes containing two tertiary amino groups, as shown in the examples.

Suitable tertiary amines for preparing the above cationic dyestuffs are dialkylanilines, for example, dimethylaniline, N - methyl-N-cyanoethylaniline, N,N'-di-(β-cyanoethyl) aniline, N,N'-di-(β-hydroxyethyl)aniline, diethylaniline, dipropylaniline, and the like; and alkyl diphenylamines such as methyldiphenylamine, ethyldiphenylamine, propyldiphenylamine and the like.

The following examples, in which parts are by weight (unless otherwise specified) and degrees are in centigrade, are presented to illustrate the present invention further.

Example 1

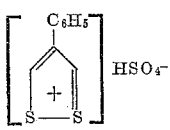

A solution of 6 parts of 4-phenyl-1,2-dithiole-3-thione in 125 parts by volume of acetone is chilled and stirred while 16 parts of 40% peracetic acid is slowly added. After the reaction is complete, the yellow product is filtered, washed and crystallized from alcohol. It is readily soluble in water to give a yellow solution, from which water-insoluble salts such as the bromide, iodide, fluoborate, thiocyanate, and perchlorate are instantaneously precipitated by addition of the respective anions. Sodium iodide-iodine solution gives a copper-colored diiodide, which may be crystallized from butanol.

Example 2

A solution of 12 parts of 5-phenyl-1,2-dithiole-3-thione in 400 parts by volume of acetone is stirred, chilled, and treated by the gradual addition of 32 parts of 40% peracetic acid. The mixture is then stirred to complete the reaction, and filtered. The yellow product is crystallized from nitromethane. It is readily soluble in water to give a yellow solution, from which perchloric acid precipitates the yellow perchlorate and sodium iodide precipitates the bright orange iodide. Picric acid gives the bright yellow picrate.

Example 3

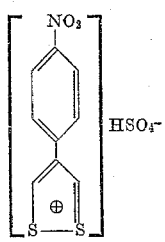

A solution of 6.5 parts of 4-phenyl-1,2-dithiolium hydrogen sulfate in 20 parts by volume of concentrated sulfuric acid is cooled to 0–5° and treated by the gradual addition of a solution of 1.60 parts by volume of concentrated nitric acid in 2.0 parts by volume of concentrated sulfuric acid. After the reaction is complete, the solution is drowned on ice and the product filtered and washed with a little cold dilute $H_2SO_4$. It may be converted to the bromide by stirring with potassium bromide, followed by filtration, washing and crystallization from methanol.

Example 4

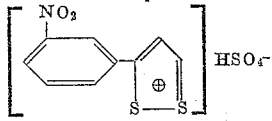

A solution of 10 parts of 3-phenyl-1,2-dithiolium hydrogen sulfate in 20 parts by volume of concentrated sulfuric acid is cooled to 0–5° and treated by the gradual addition of a solution of 2.6 parts by volume of concentrated nitric acid in 3 parts by volume of concentrated sulfuric acid. After completion of the nitration, the reaction mixture is drowned on 100 parts of ice and filtered at about −15°. The product is washed with a little very cold methanol, and crystallized from the same solvent.

Example 5

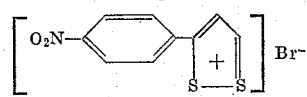

To the reaction filtrate from Example 4 is added 2.7 parts by volume of 48% HBr. The product is isolated by chilling and filtration, and crystallized from methanol.

Example 6

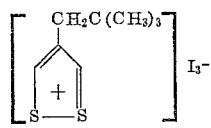

A solution of 2 parts of 4-neopentyl-1,2-dithiole-3-thione in 50 parts by volume of acetone is treated with 6 parts of 40%-peracetic acid dissolved in 10 parts by volume of acetone. After completion of the reaction, the crystalline brown product is obtained by adding HI and then filtering. It is crystallized from ethanol.

Example 7

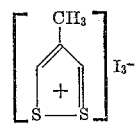

This product is obtained by the procedure of Example 6, starting with 4-methyl-1,2-dithiole-3-thione.

Example 8

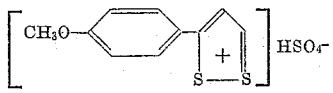

This product is obtained by the procedure of Example 2, starting with 5-p-anisyl-1,2-dithiole-3-thione.

Example 9

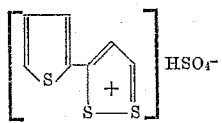

This product is obtained by the procedure of Example 2, starting with 5-(2-thienyl)-1,2-dithiole-3-thione.

Example 10

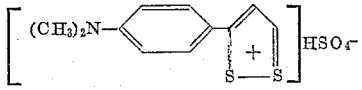

To a solution of 2.5 parts of 5-(p-dimethylaminophenyl)-1,2-dithiole-3-thione in 800 parts by volume of acetone is gradually added a solution of 5.0 parts by volume of 40% peracetic acid in 50 parts by volume of acetone. The red-violet product is purified by crystallization from acetic acid.

Example 11

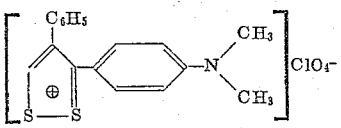

A solution of 1.0 part 4-phenyl-1,2-dithiolium hydrogen sulfate and 0.7 part dimethylaniline in 90 parts by volume of ethanol is refluxed until the reaction is complete. The product is isolated from the deep violet solution by adding perchloric acid. It crystallizes as green needles from methanol, and dyes polyacrylonitrile a bright violet shade.

Example 12

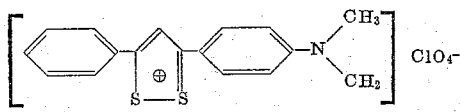

A solution of 2.0 parts 3-phenyl-1,2-dithiolium acid sulfate and 1.4 parts dimethylaniline in 100 parts by volume of ethanol is stirred and refluxed with 2.0 parts of potassium persulfate for nineteen hours. The product is isolated by adding perchloric acid, and may be purified by crystallization from methanol. It gives violet dyeings on polyacrylonitrile fiber.

*Example 13*

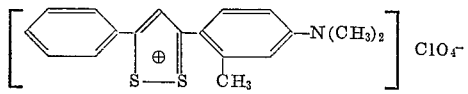

This product is obtained by the procedure of Example 12, using N,N-dimethyl-m-toluidine instead of dimethylaniline. It crystallizes from methanol as green needles.

*Example 14*

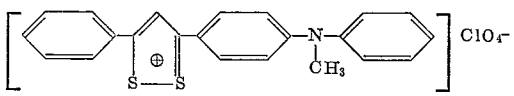

A mixture of 2.0 parts of 3-phenyl-1,2-dithiolium hydrogen sulfate, 1.6 parts of N-methyldiphenylamine, and 2.0 parts of potassium persulfate in 125 parts by volume of ethanol is stirred and refluxed for 2½ hours. The perchlorate of the product separates from the deep violet solution on adding perchloric acid. It may be purified by crystallization from propanol. It gives bright violet dyeings on polyacrylonitrile fiber.

*Example 15*

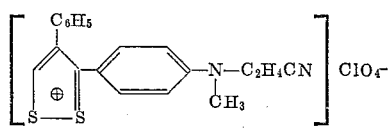

Two parts of 4-phenyl-1,2-dithiolium hydrogen sulfate, 1.0 part of potassium persulfate, and 1.2 parts of N-methyl-N-cyanoethylaniline are stirred and refluxed for 2 hours in 50 parts by volume of ethanol, and then filtered. Addition of perchloric acid to the filtrate precipitates the green perchlorate, which is crystallized from methyl Cellosolve. It gives violet dyeings on polyacrylonitrile fiber.

*Example 16*

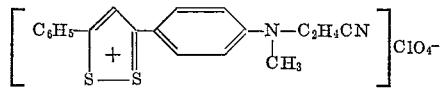

This is obtained by the procedure of the previous example, using 3-phenyl-1,2-dithiolium sulfate as starting material. It crystallizes as green needles from methyl Cellosolve.

*Example 17*

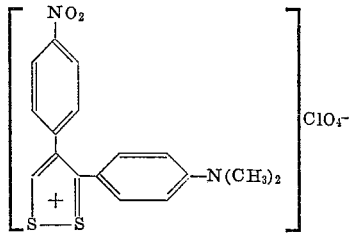

A mixture of 3.5 parts of 4(p-nitrophenyl)-1,2-dithiolium hydrogen sulfate (prepared as in Example 3), 1.5 parts of potassium persulfate, and 1.5 parts of dimethylaniline in 100 parts by volume of ethanol is stirred and refluxed for 40 minutes, filtered, and treated with perchloric acid. The purple product is separated from a yellow byproduct by crystallization from acetic acid followed by methanol.

*Example 18*

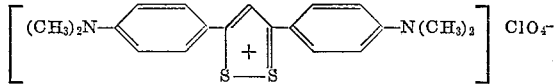

A solution of 2.0 parts of the product of Example 10 and 1.0 part of dimethylaniline in 50 parts by volume of ethanol is refluxed for 88 hours. The product is obtained by addition of perchloric acid, and crystallized as green needles from methyl Cellosolve.

*Example 19*

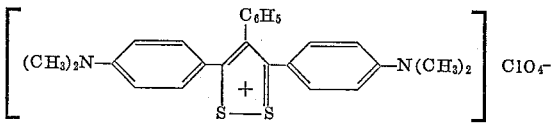

This is prepared by the procedure of the preceding example, using the product of Example 11 as starting material. It crystallizes as golden plates from ethanol.

*Example 20*

Fifty parts by volume of diethyl fumarate and 15 parts of sulfur are boiled together for two hours. The reaction product is fractionated to yield 5-carbethoxy-1,2-dithiole-3-one, an oil of B.P. 125–140° C./5 mm.

Ten parts of 5-carbethoxy-1,2-dithiole-3-one are mixed with six parts of phosphorus pentasulfide and 75 parts of pyridine and the mixture is heated to reflux for 1½ hours. The product is treated with mercuric chloride (1 equivalent) in acetone solution to yield a precipitate which then suspended in 100 parts of dilute HCl and then treated with $H_2S$ until conversion to mercuric sulfide is complete. The precipitate is filtered off and the filtrate extracted three times with fifty parts of the ether each time. The ether extracts are combined, dried and evaporated. Crystallization of the solid from hexane yields 5-carbethoxy-1,2-dithiole-3-thione as a purplish solid melting at about 65–66° C.

One part of the 5-carbethoxy-1,2-dithiole-3-thione is saponified by dissolving in a solution of five parts of sodium sulfide nonahydrate in 200 parts of water. The solution is allowed to stand at room temperature until saponification is complete. Acidification with HCl and then crystallization of the reaction product from benzene-hexane yields the compound 5-carboxy-1,2-dithiole-3-thione as a purple-brown crystalline solid melting at about 136–139° C. (with dec.).

To 4.6 parts of 5-carboxy-1,2-dithiole-3-thione dissolved in 125 parts of acetone are added, gradually at 25° C., 15 parts of 40% peracetic acid. The product, dithiolium hydrogen sulfate, is precipitated as the iodide by treatment with hydriodic acid. The iodide crystallizes from propanol as orange needles melting at 179–181° C. (with dec.).

*Example 21*

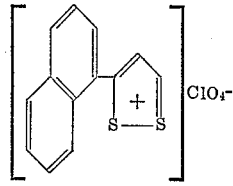

This is prepared by the procedure of Example 1 starting with an equivalent amount of 5-(1-naphthyl)-1,2-dithiole-3-thione, in place of the dithiolethione used therein.

*Example 22*

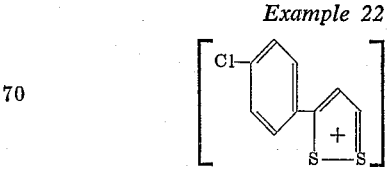

This is prepared by the procedure of Example 1, starting with an equivalent amount of 5-(p-chlorophenyl)-1,2- dithiole-3-thione, in place of the dithiolethione used therein.

I claim:

1. A compound of the formula:

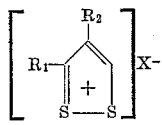

wherein each of the $R_1$ and $R_2$ groups is a member selected from the group consisting of hydrogen, halogen, phenyl, naphthyl, furyl, thienyl, benzyl and lower alkyl, said phenyl and naphthyl groups bearing up to three substituents selected from the group consisting of halogen, nitro, lower alkyl and lower alkoxy; and X is an anion of an acid having a pKa not above 4.

2. A compound of claim 1 wherein the anion is a member selected from the group consisting of bisulfate, bromide, iodide, thiocyanate, fluoroborate, picrate and perchlorate.

3. A compound of the formula:

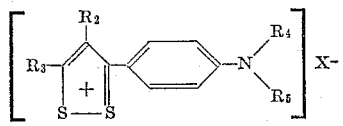

wherein $R_2$ is a member selected from the group consisting of hydrogen, halogen, phenyl, naphthyl, furyl, thienyl, benzyl and lower alkyl, said phenyl and naphthyl groups bearing up to three substituents selected from the group consisting of halogen, nitro, lower alkyl and lower alkoxy; $R_3$ is a member selected from the group consisting of $R_2$ and the radical:

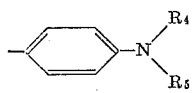

X is an anion of an acid having a pKa not above 4; and $R_4$ and $R_5$ are individually selected from the group consisting of lower alkyl, β-hydroxyethyl, phenyl and benzyl, said phenyl moieties having up to three substitutents selected from the group consisting of halogen, lower alkyl and lower alkoxy.

4. 5-phenyl-1,2-dithiolium bisulfate.

5. A process for the preparation of the compound of claim 3, which comprises condensing in the presence of an inert solvent at a temperature between 60° C. and reflux a compound of the formula:

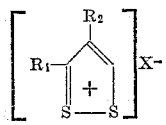

wherein each of the $R_1$ and $R_2$ groups is a member selected from the group consisting of hydrogen, halogen, phenyl, naphthyl, furyl, thienyl, benzyl and lower alkyl, said phenyl and naphthyl groups bearing up to three substituents selected from the group consisting of halogen, nitro, lower alkyl and lower alkoxy; and X is an anion of an acid having a pKa not above 4; with a tertiary aniline of the formula:

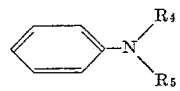

wherein $R_4$ and $R_5$ are individually selected from the group consisting of lower alkyl, β-hydroxyethyl, phenyl and benzyl, said phenyl moieties having up to three substitutents selected from the group consisting of halogen, lower alkyl and lower alkoxy.

6. The process of claim 5 wherein the reaction is conducted in the presence of potassium persulfate.

No references cited.